US006123486A

United States Patent [19]

Wilms et al.

[11] Patent Number: 6,123,486

[45] Date of Patent: Sep. 26, 2000

[54] APPARATUS FOR METERING BULK MATERIAL

[75] Inventors: Harald Wilms, Tettnang; Franz Josef Vogelsang, Ravensburg, both of Germany

[73] Assignee: Zeppelin Schuttguttechnik GmbH, Germany

[21] Appl. No.: 08/875,208

[22] PCT Filed: Jan. 13, 1996

[86] PCT No.: PCT/DE96/00072

§ 371 Date: Jun. 27, 1997

§ 102(e) Date: Jun. 27, 1997

[87] PCT Pub. No.: WO96/22241

PCT Pub. Date: Jul. 25, 1996

[30] Foreign Application Priority Data

Jan. 17, 1995 [DE] Germany ........................... 195 01 179

[51] Int. Cl.[7] ............................ B65G 3/08; B65G 53/40; G01F 11/20; G01F 11/10

[52] U.S. Cl. ............................. 406/66; 406/67; 406/135; 222/237; 222/240; 222/370

[58] Field of Search ............................... 406/66, 67, 135; 222/237, 240, 370

[56] References Cited

U.S. PATENT DOCUMENTS

| | | | |
|---|---|---|---|
| 2,280,166 | 4/1942 | Sinden | 222/237 X |
| 4,712,716 | 12/1987 | Schloz et al. | 222/189.05 |
| 5,007,564 | 4/1991 | Beth et al. | 222/217 |
| 5,324,142 | 6/1994 | Haig | 406/66 |

FOREIGN PATENT DOCUMENTS

| | | |
|---|---|---|
| 191258 | 8/1986 | European Pat. Off. . |
| 492313 | 7/1992 | European Pat. Off. . |
| 1813978 | 3/1958 | Germany . |
| 3031219 | 12/1981 | Germany . |
| 3102847 | 8/1982 | Germany . |
| 3425895 | 2/1985 | Germany . |
| 3544014 | 2/1987 | Germany . |
| 3720988 | 1/1989 | Germany . |
| 2055347 | 3/1981 | United Kingdom . |
| 2055759 | 3/1981 | United Kingdom . |
| 2166714 | 5/1986 | United Kingdom . |

*Primary Examiner*—Christopher P. Ellis
*Assistant Examiner*—Kenneth W Bower
*Attorney, Agent, or Firm*—Venable; George H. Spencer; Robert Kinberg

[57] ABSTRACT

An apparatus, which is intended for metering bulk materials, has a rotatable cell wheel (9) and a stirrer (2), arranged above the latter, and operates reliably even in the case of very sluggishly flowing bulk materials, in particular with small metering capacities, i.e., with the cell wheel (9) rotating slowly. For this purpose, the invention provides two different, isolated drives for the stirrer (2) and the cell wheel (9).

12 Claims, 4 Drawing Sheets

APPARATUS FOR METERING BULK MATERIAL

FIELD OF THE INVENTION

The invention relates to an apparatus for metering bulk material into at least one conveying line.

BACKGROUND OF THE INVENTION

So-called rotary vane feeders are known in general as metering apparatuses, with the aid of which bulk materials can be transferred out of an area at any pressure into a conveying line against a higher or lower pressure prevailing in the latter.

A cell wheel, seated in a rotationally fixed manner on a horizontal shaft, comprises a hub and radial vanes which, accordingly, bound wedge-shaped or trapezoidal chambers. The bulk material passes into at least one cell-wheel chamber, via a top charging opening, and after a rotation, for example through approximately 180°, is passed into a conveying line via a discharge opening, if appropriate, assisted by compressed air. It is usually the case that the quantity of bulk material which is metered in this way, first of all, rises as the rotational speed of the cell wheel increases and, as the rotational speed continues to increase, decreases again on account of the centrifugal force. Problems arise here in the case of sluggishly flowing, adhering and bridge-forming bulk materials since the relatively narrow inlet cross sections of the design hinder continuous filling of the cell-wheel chambers.

Furthermore, a mass flow, i.e., uniform discharge via the entire cross section of the storage container, is desired. If the material which is located in the center of the container is emptied more quickly than the material in the wall region, then incomplete emptying and regular filling of the storage container may result in the situation where it is only the material from the center of the container which is ever removed, and the material in the border region becomes old.

In order to achieve a high metering capacity even for sluggishly flowing bulk materials and to ensure the desired mass flow, the practice has thus been adopted, for example, German Offenlegungsschrift using a metering apparatus according to DE 34 25 895, of connecting to the cell wheel in a rotationally fixed manner a stirrer which extends upwards through the charging opening. This has improved the metering of sluggishly flowing bulk materials for certain metering capacities. In particular, in the case of a relatively low metering capacity, however, a stirrer of this type does not operate reliably.

SUMMARY OF THE INVENTION

The object of the invention is thus to propose a metering apparatus which operates reliably even in the case of very sluggishly flowing bulk materials, in particular with a small metering capacity, i.e., with the cell wheel rotating slowly.

An apparatus according to the invention is distinguished by two different, isolated drives being provided for the stirrer and the cell wheel.

In this way, the stirrer can be operated at a rotational speed which is independent of the rotational speed of the cell wheel. The rotational speed of the stirrer may, in particular, be coordinated with the flow behavior of the respective bulk material. At the same time, it is possible to use the entire cell-wheel rotational-speed range in which metering is possible for the purpose of controlling the metering capacity.

Typical rotational speeds-of the cell wheel are from 30 to 35 revolutions per minute with a regulating range of from 1 to 15. With a rotational speed of 30 revolutions per minute, this regulating range corresponds to a rotational-speed interval of from 2 to 30 revolutions per minute. In particular, in the case of starting-up operations, however, a very much lower degree of metering is required, so that it is also possible to activate speeds of 2 revolutions per minute. However, a stirrer of the prior art does not operate reliably at such low speeds.

The optimum rotational speed of the stirrer for loosening purposes and for achieving optimum flow properties depends to a great extent on the material in each case. A typical value is approximately 7 to 8 revolutions per minute.

By virtue of the invention providing two different drives, the stirrer can now be operated independently of the rotational speed of the cell wheel. This makes it possible to achieve optimum homogenization of the bulk material irrespective of the metering capacity. Specific adaptation of the rotational speed of the stirrer makes it possible to avoid, in a deliberate manner, material-specific bridge formation in front of the charging opening of the cell-wheel housing. This advantageous quality of the stirrer may, in certain circumstances, be improved further by the stirrer having a specific geometrical design.

If necessary, the invention can also set the directions of rotation of the stirrer and of the cell wheel to run counter to one another.

The cell-wheel drive shaft is advantageously designed as a hollow shaft. This has the advantage that a stirrer drive shaft can be routed through the hollow cell-wheel drive shaft, the axes of the two drive shafts coinciding. In this case, the stirrer drive shaft can be mounted in the hollow cell-wheel drive shaft via corresponding rotary bearings, e.g., ball bearings.

The hub of the stirrer and the drive shaft thereof are thus located directly over the hub and drive shaft of the cell wheel, with the result that the flow of the bulk material into the charging opening, i.e., into the chambers of the cell wheel, is not disrupted by these components. Such a disruption would occur, for example, by way of a stirrer drive in which the stirrer is driven via an angular gear mechanism and a drive shaft running above the cell wheel, transversely with respect to the axis of rotation.

The cell-wheel drive shaft, in turn, may be mounted in the cell-wheel housing which, for this purpose, is preferably provided with a downwardly projecting tubular attachment or bearing stub.

In a particular embodiment, a gear mechanism is provided at the bottom end of the cell-wheel drive shaft. In this way, it is possible for the torque of a drive unit, for example, of an electric motor, whose axis of rotation does not coincide with the axis of rotation of the cell-wheel drive shaft to be transmitted to the cell-wheel drive shaft.

A chain mechanism or belt mechanism is preferably used for this purpose. In this case, a toothed ring or a belt pulley is located at the bottom end of the cell-wheel drive shaft. A chain or a belt is then positioned in the toothed ring or in the belt pulley. The chain runs over a chain pinion, which is spaced apart transversely from the cell-wheel drive shaft, or the belt runs over a further belt pulley, and said pinion or belt pulley is connected to a motor shaft located parallel to the cell-wheel drive shaft.

In this manner, the cell-wheel drive shaft can be driven by a motor which is located beside the cell-wheel housing and of which the motor shaft is located parallel to the cell-wheel drive shaft. However, any form of angular gear mechanism, for example with a conical gear wheel and a corresponding toothed ring on the hollow cell-wheel drive shaft, would also be conceivable, so that the cell-wheel drive shaft would be driven via a shaft located transversely with respect to the cell-wheel drive shaft.

In a particular embodiment, use is made, for driving the stirrer drive shaft, of a motor whose motor housing is connected fixedly to the cell-wheel housing or to the bearing stub, and which has a hollow bearing sleeve as the drive shaft, the stirrer drive shaft being retained and mounted in said bearing sleeve. Since the motor housing is fixed and the bearing sleeve, as motor drive shaft, has already been mounted rotatably, the action of plugging the stirrer drive shaft into this bearing sleeve simultaneously achieves mounting of the stirrer drive shaft and frictionally locking connection to the drive shaft serving as bearing sleeve. In this case, the frictional locking between the stirrer drive shaft and bearing sleeve may be produced, for example, via a clamping connection.

It is also possible, for a concrete exemplary embodiment, to use a single motor for driving both the cell-wheel drive shaft and the stirrer drive shaft. The task of regulating the drive separately could then take place via a so-called planetary gear mechanism with a plurality of power transmission paths.

A particular embodiment of an apparatus according to the invention provides a stirrer housing which can be removed from the cell-wheel housing. As a result, after the stirrer housing has been removed and the cell-wheel housing has been lowered, the cell wheel is accessible from above.

The stirrer hub is advantageously designed such that it can be plugged and/or screwed onto the top end of the stirrer drive shaft. This allows the complete stirrer to be taken away upon removal of the stirrer housing. The accessibility of the cell wheel and/or of the cell-wheel chamber is further improved as a result.

This is the case, in particular, when the covering plate, which is provided above the cell wheel in order to cover over at least the area of one chamber of the cell wheel, is connected fixedly to the stirrer housing, so that said covering plate is lifted with the stirrer housing from the cell-wheel housing. If the stirrer is provided with a plug-on hub, as is outlined above, it is possible for the entire stirrer housing to be lifted together with this carrying plate and for the cell-wheel housing, and thus the entire rotary vane feeder, to be lowered from the stirrer housing without the stirrer itself causing an obstruction by way of its blades or vanes.

For the frictionally locking or positively locking connection of the stirrer hub to the stirrer drive shaft, it is recommended here to use at least one adjusting spring which is seated in a corresponding axis-parallel slit of the stirrer drive shaft. Correspondingly, axis-parallel grooves are likewise provided on the inside of a receiving bore of the stirrer hub for receiving the stirrer drive shaft, and the adjusting springs can slide into these grooves in the axial direction when the stirrer hub is plugged on.

BRIEF DESCRIPTION OF THE DRAWINGS

An exemplary embodiment of the invention is illustrated in the drawings and is explained in more detail hereinbelow with reference to the figures.

In the drawings, in detail.

DETAILED DESCRIPTION OF THE INVENTION

Figure 1:
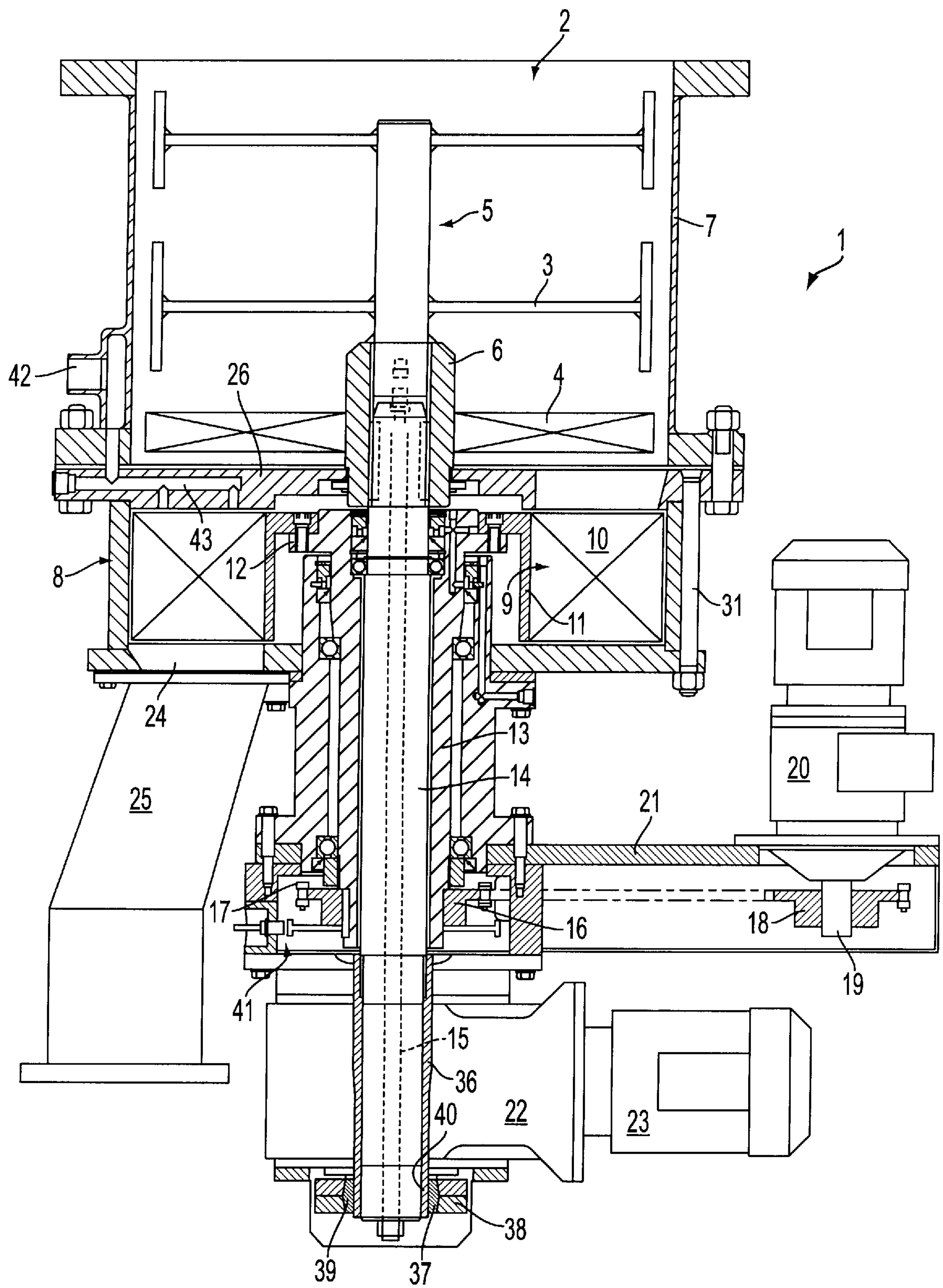
FIG. 1 shows a cross section through a metering apparatus according to the invention, the apparatus being in the assembled state.

The metering apparatus 1 according to FIG. 1 has a stirrer 2 with stirring vanes 3, stirring blades 4 and a stirrer hub 5. The bottom end of the stirrer hub 5 is provided with a receiving bore 6. The entire stirrer 2 is located in a stirrer housing 7. In this case, the stirrer housing 7 is cylindrical. However, a conical shape with an appropriately adapted stirrer is also readily conceivable. The unloading region of the storage silos is usually conical as well, so that such a conical stirrer housing would be adapted to the unloading region of the storage silo.

A cell-wheel housing 8 adjoins the bottom of the stirrer housing 7. Located with in the cell-wheel housing 8 is a cell wheel 9 with cell vanes 10 which are fastened on a cell-wheel rim 11. The cell-wheel rim 11 is fastened, i.e., in the present case screwed, on an annular attachment 12 of a cell-wheel drive shaft 13.

Located in the interior of the cell-wheel drive shaft 13 is a stirrer drive shaft 14, which is likewise designed as a hollow shaft. Extending through the interior of the stirrer drive shaft 14 is a fastening rod 15, by means of which the stirrer hub 5 can be fastened, e.g., screwed, onto the stirrer drive shaft 14.

Figure 4:
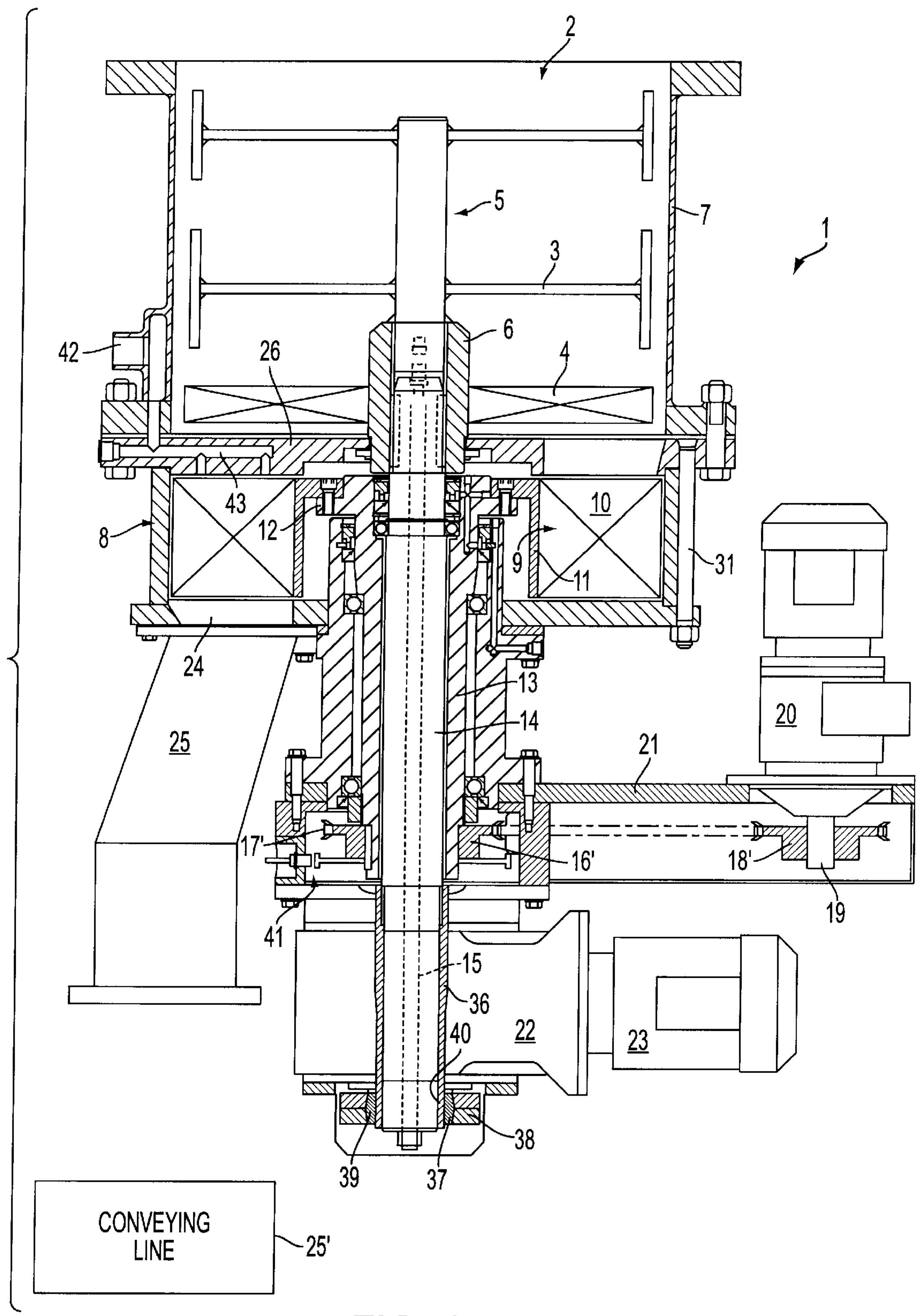
FIG. 4 is a cross section through another embodiment of the metering apparatus according to the invention.

A toothed ring 16 is placed at the bottom end of the cell-wheel drive shaft 13 and has a chain 17 positioned over it. The chain 17 is also positioned over a chain pinion 18 which in fastened on the motor shaft 19 of a motor 20. The motor 20 is fixed via a motor flange plate 21. Toothed ring 16, chain 17 and chain pinion 18 may, equivalently, be replaced by belt pulley 16', belt 17' and belt pulley 18', as shown in FIG. 4.

The stirrer drive shaft 14 is operated via a gear mechanism 22 and the motor 23.

Located on the cell-wheel housing 8, beneath an outlet opening 24, in an outlet stub 25 which serves for connecting the outlet opening 24 to a conveying line 25'. Provided above the outlet opening 24, on the top side of the cell wheel 9, is a covering plate 26 which closes off at least one chamber of the cell wheel 9, this ensuring the function of a rotary vane feeder.

Figure 2:
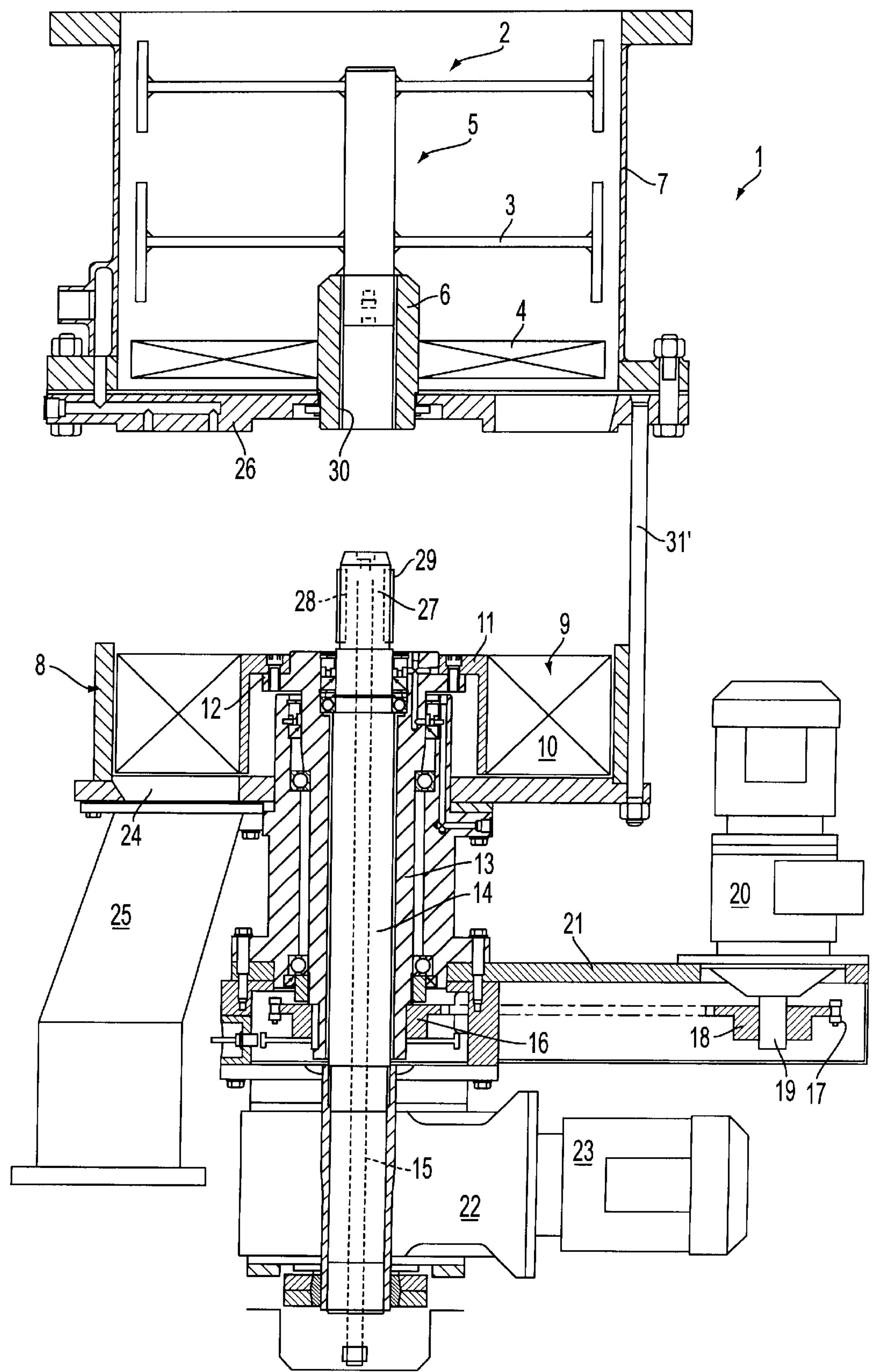
FIG. 2 shows an apparatus according to FIG. 1 with the rotary vane feeder in the lowered position.

In the illustration according to FIG. 2, the cell-wheel housing 8 has been removed from the stirrer housing 7 and lowered downwards. it can be seen in this case that the top end 27 of the stirrer drive shaft 14 is provided with axis-parallel grooves 28 into which adjusting springs 29 are plugged. The receiving bore 6 of the stirrer hub 5 in provided with corresponding receiving grooves 30 into which the adjusting springs 29 slide when the stirrer is plugged onto the top end 27 of the stirrer drive shaft 14, this producing a frictionally locking connection as regards any rotary movement.

This configuration of the stirrer hub 5 and of the stirrer drive shaft 14 makes it possible for the stirrer housing 7, with fastened covering plate 26, to be lifted from the cell-wheel housing 8 together with the stirrer 2. This means that the cell wheel 9 is particularly easily accessible. The stirrer 2 can be installed simply by placing the stirrer housing 7 on the cell-wheel housing 8.

The stirrer housing 7 and cell-wheel housing 8 can be connected, for example, via studs 31 (shown in FIG. 1). By using extended studs 31', the cell-wheel housing can be suspended from the stirrer housing 7 even in the lowered position, the cell-wheel housing 8 being accessible from above, for example, for cleaning, maintenance or repair purposes.

Figure 3:
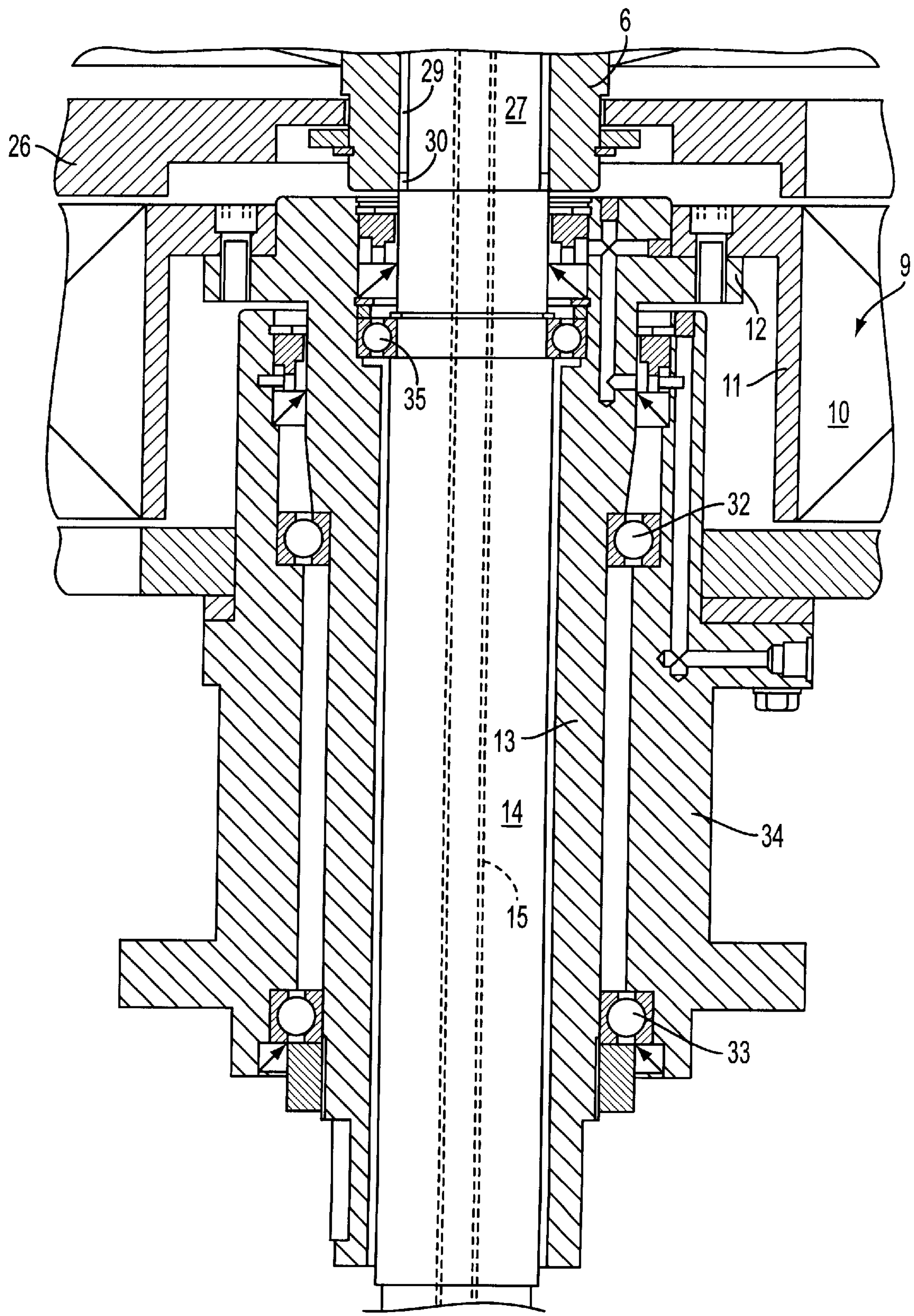
FIG. 3 shows an enlargement of a detail after the two drive shafts have been mounted.

The illustration according to FIG. 3 illustrates the specific mounting arrangement of the two drive shafts 13, 14 in more detail. This mounting arrangement comprises a top ball bearing 32 and a bottom ball bearing 33, by means of which the hollow cell-wheel drive shaft 13 is mounted rotatably in a tubular bearing stub 34 which is fastened on the cell-wheel housing 8. This illustration likewise shows the top ball bearing 35 by means of which the stirrer drive shaft 14 is mounted rotatably in the interior of the cell-wheel drive shaft 13.

Returning to FIG. 1, the gear mechanism 22 has a drive shaft which is designed as a hollow bearing sleeve 36. The stirrer drive shaft 14 is plugged into this bearing sleeve 36. Located on the underside of the gear mechanism 22 is a clamping ring 37 whose profile is in the form of a double wedge. This clamping ring 37 is enclosed by two annular compressible disks 38, of which the inner circumferential surface 39 is bevelled and thus adapted to the double-wedge profile of the clamping ring 37. Compression of the two compressible disks 38 in the vertical direction thus compresses the clamping ring 37 radially inwards, as a result of which the bottom end 40 is clamped to the stirrer drive shaft 14. As a result, the stirrer drive shaft 14, at its bottom end, is both mounted rotatably and connected in a frictionally locking manner to the motor 23.

According to the present exemplary embodiment, a metering apparatus also comprises a clock 41 as well as a scavenging-air connection 42 and a compressed-air supply line 43.

By virtue of the mounting arrangement described, the cell-wheel drive shaft 13 and the stirrer drive shaft 14 are mounted within the bearing stub 34, shown in FIG. 3, such that they can rotate independently of one another. As a result, the stirrer 2 can be moved independently of the rotation of the cell wheel 9. In this case, the stirrer 2 is driven via the stirrer drive shaft 14, the angular gear mechanism 22 and the motor 23. Isolated from this, the cell wheel 9 is caused to rotate by means of the cell-wheel drive shaft 13 and the chain drive 16, 17, 18 via the motor 20. The rotational speed of the cell wheel can be measured via the clock 41 and used for the purpose of regulating the metering capacity.

The scavenging-air connection 42 can change and calibrate the solid bulk material/gas composition. For optimum conveying and metering results, this composition has to have specific values. Compressed air can be blown into the unloading region of the cell-wheel chambers via the compressed-air supply line 43, in order to speed up the unloading operation.

Even in the case of sluggishly flowing bulk material, the independent operation of the stirrer 2 at very different metering capacities, in particular even when the cell wheel 9 is rotating extremely slowly, means that a metering apparatus of the type described ensures reliable functioning in terms of good homogenization of the bulk material while simultaneously avoiding bridge formation. In this case, the top vanes 3 of the stirrer serve predominantly for good homogenization of the bulk material, while the bottom blades 4 predominantly provide for uniform removal over the entire cross section.

The present invention has been described in detail with respect to preferred embodiments. It will be apparent from the foregoing to those skilled in the art that changes and modifications may be made without departing from the present invention. In its broader aspects, the present invention, as defined in the appended claims, is intended to cover all such changes and modifications within the true spirit of the invention.

1 Metering apparatus
2 Stirrer
3 Stirring vanes
4 Stirring blades
5 Stirrer hub
6 Receiving bore
7 Stirrer housing
8 Cell-wheel housing
9 Cell wheel
10 Cell vanes
11 Cell-wheel rim
12 Annular attachment
13 Cell-wheel drive shaft
14 Stirrer drive shaft
15 Fastening rod
16 Toothed ring
16' Belt pully
17 Chain
17' Belt
18 Chain pinion
18' Belt pully
19 Motor shaft
20 Motor
21 Motor flange plate
22 Gear mechanism
23 Motor
24 Outlet opening
25 Outlet stub
25' Conveying line
26 Covering plate
27 Top end
28 Grooves
29 Adjusting spring
30 Receiving grooves
31 Fastening studs D
31' Ectended fastining studs
32 Ball bearing
33 Ball bearing
34 Bearing stub
35 Top ball bearing
36 Bearing sleeve
37 Clamping ring
38 Compressible disks
39 Inner circumferential surface
40 Bottom end
41 Clock
42 Scavenging-air connection
43 Compressed-air supply line

What is claimed is:

1. An apparatus for metering bulk material into at least one conveying line, said apparatus comprising:

a cell wheel having a number of chambers, said cell wheel rotating around a vertical axis;

a cell-wheel housing, containing the cell wheel and having a top and a bottom, the bottom having an outlet opening for connection to the conveying line, the top having a charging opening for gravitational charging with the bulk material to be conveyed;

a covering plate, located above the cell wheel, which covers over an area corresponding to a size of at least one said chamber of the cell wheel;

a stirrer arranged above the cell wheel, the stirrer comprising a stirrer hub;

a stirrer housing containing the stirrer and removably attached to the top of the cell-wheel housing;

two different, isolated drives respectively provided for the stirrer and the cell wheel, the isolated drive of the stirrer including a drive shaft, said stirrer hub being one of plugged and screwed onto the stirrer drive shaft; and a frictionally locking connection between the stirrer drive and the stirrer hub.

2. The apparatus as claimed in claim 1, wherein the cell-wheel drive comprises a drive shaft and a motor with a motor housing, said motor housing being fixedly connected to the cell-wheel housing or to a bearing stub fastened to the cell-wheel housing; and wherein the stirrer drive further comprises a hollow bearing sleeve, the stirrer drive shaft being retained and mounted in said bearing sleeve.

3. The apparatus as claimed in claim 1, further comprising a fastening rod, located within said stirrer drive shaft, the stirrer hub being connected to the stirrer drive shaft by screwing it onto the fastening rod.

4. The apparatus as claimed in claim 1, wherein the stirring housing further contains stirring blades in a region of the stirring housing lower than that of the stirrer.

5. The apparatus as claimed in claim 1, wherein the isolated drive of the cell wheel includes a cell-wheel drive shaft, said cell-wheel drive shaft has a bottom end, and wherein the cell-wheel drive comprises a gear mechanism, the gear mechanism being located at the bottom end of the cell-wheel drive shaft.

6. The apparatus as claimed in claim 5, wherein the gear mechanism comprises a chain mechanism or a belt mechanism.

7. The apparatus as claimed in claim 1, wherein the isolated drive of the stirrer includes a shaft and wherein the stirrer comprises a stirrer hub which is one of plugged and screwed onto the stirrer drive shaft.

8. The apparatus as claimed in claim 1, further comprising at least one adjusting spring, providing said frictionally locking connection.

9. The apparatus as claimed in claim 1, wherein the isolated drive of the stirrer includes a cell-wheel drive shaft which is a hollow shaft.

10. The apparatus as claimed in claim 1, wherein the stirrer drive shaft is rotatably mounted in the cell-wheel drive shaft.

11. The apparatus as claimed in claim 9, wherein the isolated drive of the stirrer includes a stirrer drive shaft which is routed through the cell-wheel drive shaft.

12. The apparatus as claimed in claim 11, further comprising a tubular bearing stub fastened to the cell-wheel housing, wherein the cell-wheel drive shaft is rotatably mounted in the tubular bearing stub.

* * * * *